(12) United States Patent
Gmelin

(10) Patent No.: US 8,678,304 B2
(45) Date of Patent: Mar. 25, 2014

(54) METHOD OF ACTIVATING A MOUNTABLE HYDRAULIC APPLIANCE, AND SUCH MOUNTABLE HYDRAULIC APPLIANCE, IN PARTICULAR FOR DEMOLITION, COMMINUTION OR RECYCLING

(75) Inventor: Wolfgang Gmelin, Oestringen (DE)

(73) Assignee: Toni Kiesel, Ravensburg (DE)

( * ) Notice: Subject to any disclaimer, the term of this patent is extended or adjusted under 35 U.S.C. 154(b) by 505 days.

(21) Appl. No.: 12/928,397

(22) Filed: Dec. 10, 2010

(65) Prior Publication Data

US 2011/0138796 A1 Jun. 16, 2011

(30) Foreign Application Priority Data

Dec. 10, 2009 (DE) .......................... 10 2009 057 507
Jun. 10, 2010 (DE) .......................... 10 2010 023 308

(51) Int. Cl.
*B02C 1/02* (2006.01)

(52) U.S. Cl.
USPC ........................................ 241/30; 241/101.73

(58) Field of Classification Search
USPC ................... 241/30, 101.73, 264–269
See application file for complete search history.

(56) References Cited

U.S. PATENT DOCUMENTS

| | | | | |
|---|---|---|---|---|
| 5,626,301 A | * | 5/1997 | Morikawa et al. | ............ 241/266 |
| 8,020,799 B2 | * | 9/2011 | Muraoka | ................... 241/101.73 |

FOREIGN PATENT DOCUMENTS

| | | |
|---|---|---|
| DE | 42 01 352 A1 | 7/1993 |
| DE | 196 01 735 A1 | 7/1997 |
| DE | 600 21 539 T2 | 5/2006 |
| EP | 2 033 730 A1 | 3/2009 |
| NL | 9 001 321 A | 1/1992 |

* cited by examiner

*Primary Examiner* — Mark Rosenbaum
(74) *Attorney, Agent, or Firm* — Kriegsman & Kriegsman

(57) ABSTRACT

The invention relates to a method of activating a mountable hydraulic appliance, and to such mountable hydraulic appliance for the shearing or crushing of structures, in particular for demolition, comminution or recycling, said appliance having an upper jaw and a lower jaw at least one of which is pivotally hinged on a bearing axis arranged on the housing, the hinged jaw being activated by a first hydraulic cylinder and by at least one further hydraulic cylinder acting thereon so as to be moved from an open position to a cutting position and/or a closed position and vice versa, the hydraulic cylinders which act upon the hinged jaw being either pressurized simultaneously, or the initiation of a closing movement of the at least one hinged jaw from an open position being such that initially only one hydraulic cylinder is pressurized and, as the required compression force increases during the closing movement, the at least one further hydraulic cylinder is equally pressurized.

15 Claims, 3 Drawing Sheets

Figure 1A:
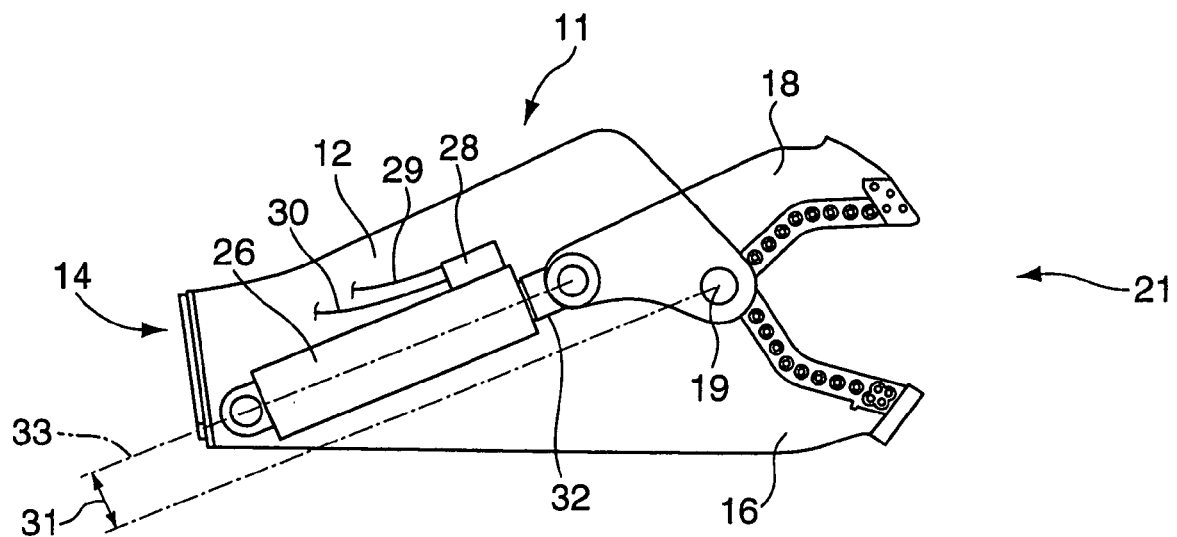

METHOD OF ACTIVATING A MOUNTABLE HYDRAULIC APPLIANCE, AND SUCH MOUNTABLE HYDRAULIC APPLIANCE, IN PARTICULAR FOR DEMOLITION, COMMINUTION OR RECYCLING

The invention relates to a method of activating an opening movement and a closing movement of a mountable hydraulic appliance for the shearing and crushing of structures, and a mountable hydraulic appliance, in particular for demolition, comminution or recycling.

DE 600 21 539 T2 discloses a mountable appliance of the kind which may be coupled to a boom and to a hydraulic system of a carrier apparatus such as a skidsteer loader or an excavator. For this purpose, a coupling interface is provided on a housing of the mountable appliance so as, on the one hand, to attach the housing of the mountable appliance, particularly in a replaceable manner, to the boom and, on the other hand, to connect the hydraulic system of the carrier apparatus with hydraulic pressure lines, i.e. with a supply line and a return line, of the mountable appliance. Provision is made for the housing to be provided with a fixed lower jaw or a fixed lower projection and with an upper jaw or an upper projection which is hinged with respect thereto, said upper jaw being arranged in such a manner as to be pivotable about a bearing axis arranged on said housing. This hinged jaw is driven by a single hydraulic cylinder, such that in a closing movement the jaw may be transferred from an open position to a cutting position and further to a closed position and may subsequently be transferred back, in an opening movement, to an open position. For this purpose, the hydraulic cylinder, in particular the piston rod thereof, acts on the hinged jaw. On the opposite side, the hydraulic cylinder is mounted on the housing in a fixed though pivotably movable manner.

Mountable hydraulic appliances of this type are used for processing structures such as scrap. The comminution process may include both iron and nonferrous metal. Scrap of this type may be present in various different forms. This may include, for example, vessels, offshore platforms, or the like. Likewise, individual metallic component parts, such as beams, ducts, tubes or the like, may be included. Moreover, such mountable appliances may be used for the handling of structures such as buildings, motorways, or the like, and may serve, in this case, for the crushing of a road surface, in particular a concrete surface, or other structural members made of concrete.

The arrangement of the hydraulic cylinder as well as the configuration of the hinged jaw and the mounting thereof on the housing are such that a gradually increasing compression force may be built up as the closing movement of the hinged jaw advances, the compression force being at its highest level once a tip of the movable jaw is positioned at the same level or slightly offset with respect to a tip of an opposing jaw.

In an alternative embodiment differing from the one set out above, said mountable hydraulic appliance is known to be configured in the manner of a pair of scissors, such that an upper jaw and a lower jaw are each driven in a pivotably movable manner about a bearing axis on the housing.

Depending on the intended utilisation, said jaws are formed with cutting knives, with breaking or crushing teeth or with a combination of crushing teeth and cutting knives.

The requirements such mountable hydraulic appliances are expected to meet are ever increasing. The aim is in particular to achieve increased compression forces, in particular cutting forces and/or crushing forces, while maintaining the overall dimensions of the appliance at a constant size. The point is, on the one hand, to ensure that the size of these mountable hydraulic appliances, which even in their smaller configurations have a weight of at least 200 kg, remains unchanged in order to enable rapid manipulation. On the other hand, they are expected, though identical in installation size, to be capable of comminuting, shearing or crushing greater wall thicknesses. The problem encountered in particular in the process of comminuting tubes is that while with the jaws in their fully open position a jaw opening does succeed in embracing said tubes, the initial cutting force is insufficient, such that in many cases said tubes cannot be cut, and a mountable appliance with greater dimensions will be necessary. In addition, mountable appliances of this type have the disadvantage that the opening and closing speeds of the hinged jaw are very low, which is due to the high return volume between the surface of the pressure piston and the surface of the piston rod of the hydraulic cylinder. This causes an increased cycle time for a cutting operation.

The invention is therefore based on the object of proposing a method of activating a mountable hydraulic appliance, as well as a mountable hydraulic appliance for the shearing or crushing of structures, in particular for demolition, comminution or recycling, such that it is possible to achieve an increased cutting force from the very beginning of a closing movement of at least one hinged jaw and, in addition, to enable shorter cycle times during opening and closing movements of the at least one hinged jaw to an open position and a cutting position and/or a closed position.

This object is achieved, according to the invention, by a method of activating a mountable hydraulic appliance having an upper jaw and a lower jaw at least one of which is hinged on a bearing axis arranged on the housing, in which method the hinged jaw is activated by means of a first and at least one further hydraulic cylinder acting thereon so as to be moved from an open position to a cutting position and/or a closed position and vice versa and both the first and the at least one further hydraulic cylinders act on the hinged jaw using lever arms for force introduction which differ from each other.

In the first embodiment according to the invention for activating the at least one hinged jaw, the hydraulic cylinders acting on the jaw are pressurised simultaneously. Thus, an increased compression force is created from the very beginning of the closing movement, such that the sum of the compression forces created by the hydraulic cylinders acting on the hinged jaw is, in total, considerably higher, even at the beginning of the closing movement, than that achievable with the prior-art appliance mentioned hereinabove which is configured with only one hydraulic cylinder.

In an alternative configuration according to the invention for activating the at least one hinged jaw, provision is made for the initiation of a closing movement of the at least one hinged jaw from an open position to be such that initially only one hydraulic cylinder is pressurised and, as the required pressure increases, the at least one further hydraulic cylinder is equally pressurised. Hence, in a closing movement under low-force operating conditions requiring no cutting or crushing work, only one hydraulic cylinder is pressurised in order to achieve a rapid closing speed, while once an increased compression force needs to be exerted, the at least one further hydraulic cylinder is additionally activated. Thus it is possible, whenever needed, to achieve an increase in cutting force during the progress of a closing movement carried out hitherto at rapid speed.

According to a preferred configuration of the method, only one hydraulic cylinder is pressurised for activating an opening movement of the at least one hinged jaw, in particular from a closed position or cutting position to an open position. This enables a simplified activation and savings in terms of cycle time, due to a rapid transfer of the at least one hinged jaw to an open position before the subsequent cutting operation is initiated.

In addition, provision is made for the hydraulic cylinder(s) acting on the at least one hinged jaw for causing an opening movement and/or a closing movement to be activated via at least one valve of a hydraulic control device. By means of a valve of this type, it is possible, in addition, to achieve a more rapid travel speed of the hinged jaw. Moreover, this permits the individual hydraulic cylinders to be flexibly and rapidly enabled and disabled.

In a further preferred configuration of the method, provision is made for a closing movement of the at least one hinged jaw to be such that initially only the one of the hydraulic cylinders is activated which in a first closing phase has a higher closing speed and/or a greater lever arm than the at least one further hydraulic cylinder, and that in an ulterior phase of the closing movement, in which an increase in required compression force takes place, the at least one further hydraulic cylinder is additionally activated, such that at that point in time during the closing movement an increased cutting force is generated. This arrangement has the advantage that prior to the actual exertion of the required cutting force, a rapidly advancing gripping movement or closing movement may take place and that the increased cutting force is created only when actually needed.

In a further preferred configuration of the method, provision is made for the at least one further hydraulic cylinder to be activated, during a closing movement of the hinged jaw, as a damping cylinder counteracting the at least one hydraulic cylinder which performs said closing movement. The performing of a cutting operation, in particular when cast material or hardened material is involved, will lead to an abrupt fracture which causes a rapid pressure relief of the at least one activated hydraulic cylinder. This may lead to a damage of packings of the hydraulic cylinder, such as piston packings and piston-rod packings. In order to avoid this, at least one further hydraulic cylinder is preferably operated as a damping cylinder, which is activated with a compression force opposing that of the hydraulic cylinder performing the cutting movement, so as to dampen and counteract this abrupt pressure relief. This has the advantage that it is possible to avoid damage of the packing of the hydraulic cylinder which might otherwise occur in such an instance of abrupt pressure relief.

The object on which the invention is based is achieved by a mountable hydraulic appliance for the cutting or crushing of structures, in particular for demolition work, for comminuting jobs or for recycling tasks, in which a first hydraulic cylinder and one further hydraulic cylinder act on at least one hinged jaw pivotally arranged about a bearing axis mounted on a housing, the at least two hydraulic cylinders which act on said hinged jaw exerting their respective actions on said hinged jaw by means of lever arms differing from each other. Thus, it is possible to achieve an increase in force, in particular during a cutting movement or closing movement of the mountable appliance, such that, for example, in the case of a first hydraulic cylinder in which the lever arm decreases as the closing movement is progressing, the at least one further hydraulic cylinder may exert the required cutting or closing force since in this range its lever arm will increase or be at its maximum. Thus, configuration advantages both with respect to speed of operation and exertion of force are enabled.

In another preferred configuration of the invention, provision is made for the respective acting points of the hydraulic cylinders on the hinged jaw to differ from each other in their distance from the bearing axis of said hinged jaw. This configuration has the additional advantage that due to the utilisation of at least two hydraulic cylinders a division of forces takes place upon force introduction into the hinged jaw. Thus, although the force acting on the hinged jaw and on the housing achievable by each one of the individual hydraulic cylinders will be inferior to that achievable using one single hydraulic cylinder, this will allow a better force distribution and/or force introduction into the housing of the mountable appliance and/or into the hinged jaw and/or a better dynamic force distribution during the closing movement. In this arrangement, provision may be made for the acting points of the hydraulic cylinders situated opposite the hinged jaw to be arranged in turn on a hinged jaw or on a housing, respectively. Provision may alternatively be made for these acting points to be distinct from each other or to lie in a common acting point. This makes it possible, in addition, to position the at least one further hydraulic cylinder in a simple manner with respect to the first hydraulic cylinder while maintaining the pivotal mobility of the hinged jaw. Moreover, this makes it possible to specifically achieve differently dimensioned closing forces across the progression of a closing movement of the hinged jaw, such that the dynamic cutting force distribution may be configured as desired over the cutting range.

According to a preferred embodiment of the invention, provision is made for the hinged jaw to be acted upon by at least one further hydraulic cylinder the longitudinal axis of which is arranged at an angle of attack divergent from that of the longitudinal axis of the first hydraulic cylinder. This arrangement has the advantage that due to their differing angles of attack, the at least two hydraulic cylinders acting upon the hinged jaw will have different lever arms and will thus produce differently dimensioned initial cutting forces, provision being made in particular for an increased cutting force to be produced from the very beginning of a closing movement starting from an open position. As the closing movement further advances, the compression force produced by the hydraulic cylinders in order to generate the cutting force and exerted respectively on the hinged jaw will continually be varying, due to the differing angles of attack, with the hydraulic cylinders co-operating in such a manner that a constant, high dynamic distribution of cutting forces over the entirety of the cutting range, particularly between an open position and a closed position, may be achieved.

In an alternative, preferred embodiment of the invention, provision is made for the acting point of the at least one further hydraulic cylinder to coincide with the acting point of the first hydraulic cylinder. This makes it possible in most cases to increase the angles of attack of the hydraulic cylinders with respect to each other and to achieve a central force introduction into the jaw. According to an alternative configuration of the invention, provision is made for the longitudinal axes of the first hydraulic cylinder and of the at least one further hydraulic cylinder, acting both on the hinged jaw in different acting points, are in parallel alignment with respect to each other. This alternative orientation of the hydraulic cylinders, the acting points of which on the hinged jaw differ from each other in their distance from the bearing axis, equally enables advantages analogous to those encountered in the arrangement of the hydraulic cylinders differing from each other in respect to their angles of attack.

Provision is made, in particular, for an increase in cutting force to be produced at the beginning of the closing movement of the at least one hinged jaw. Owing to the arrangement of at least two hydraulic cylinders acting on the hinged jaw with different angles of attack, an increase in cutting force by, for example, 50% is achieved at the beginning of a closing movement of the hinged jaw.

In a further preferred configuration of the invention, provision is made for the first and the at least one further hydraulic cylinders to abut, or have a counter-abutment, against the housing. This enables a simple structural design. As a consequence, in many cases hydraulic cylinders having different lengths are used, with the possibility, due to the activation of the pivotal movement by at least two hydraulic cylinders, of generally utilising smaller hydraulic cylinders than those used according to the state of the art. The utilisation of smaller hydraulic cylinders has the advantage of providing a longer stroke while having an identical installation length, as they have a smaller dead length. The dead length of a hydraulic cylinder ensues from the difference between the total length of the hydraulic cylinder and the stroke length thereof. Moreover, the utilisation of smaller hydraulic cylinders has the advantage of enabling higher operating speeds as well as lower inertia of masses in movement.

In addition, provision is preferably made for the first and the at least one further hydraulic cylinders to act on the hinged jaw with their respective piston rods. This permits to achieve an optimised utilisation in terms of packaging space. Alternatively, provision may be made for the housings of the hydraulic cylinders to be arranged on the hinged jaw. In special cases the hydraulic cylinders may also be oriented in mutually opposite directions.

In a further preferred configuration of the mountable hydraulic appliance, the first hydraulic cylinder has a greater lever arm than the at least one further hydraulic cylinder when the hinged jaw is in an open position. Due to the presence of at least one further hydraulic cylinder, it is possible to arrange the first hydraulic cylinder with a more advantageous lever arm ratio than would be possible with the utilisation of only one single hydraulic cylinder. Owing to this and to the addition of at least one further hydraulic cylinder it is possible, in particular at the beginning of the cutting movement, to achieve an increased cutting force, at least at the beginning of the closing movement of the at least one jaw.

In a further preferred configuration of the invention, provision is made for the hydraulic cylinders acting upon the hinged jaw to be capable of being pressurised in parallel. This process uses in particular a hydraulic control device from which a piston-side connection line and a piston-rod-side connection line extend, leading to the respective hydraulic cylinders. Owing to the parallel pressurisation of the hydraulic cylinders acting upon the hinged jaw, no additional control effort needs to be made. Though activated simultaneously, the hydraulic cylinders will not mutually get in each other's way during a closing movement or an opening movement of the at least one hinged jaw.

In addition, provision is made for the sum of the cylinder volumes of the hydraulic cylinders acting upon the hinged jaw to be less than or equal to the hydraulic delivery volume of the hydraulic system. Thus, a maximum pressurisation of the hydraulic cylinders acting upon the hinged jaw may be ensured. At the same time, this permits to achieve accelerated opening and closing movements of the at least one hinged jaw.

In addition, provision is made for the hydraulic cylinders acting upon the hinged jaw to have differently dimensioned piston diameters. This permits to achieve a high degree of flexibility in designing the dynamic distribution of cutting forces and in activating the opening and closing movements of the at least one jaw.

Figure 1B:
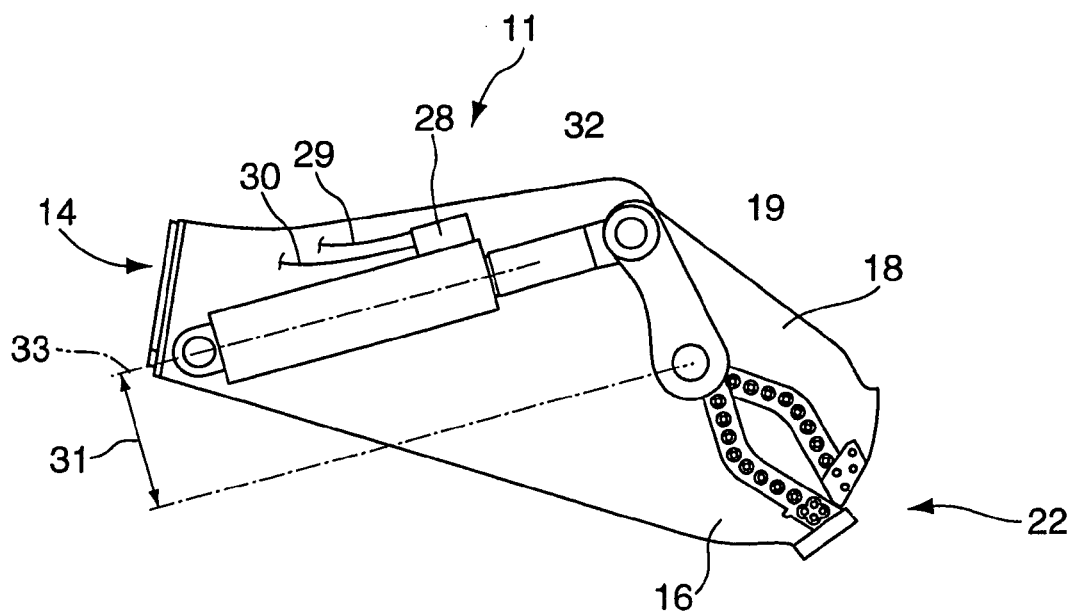
Figure 2A:
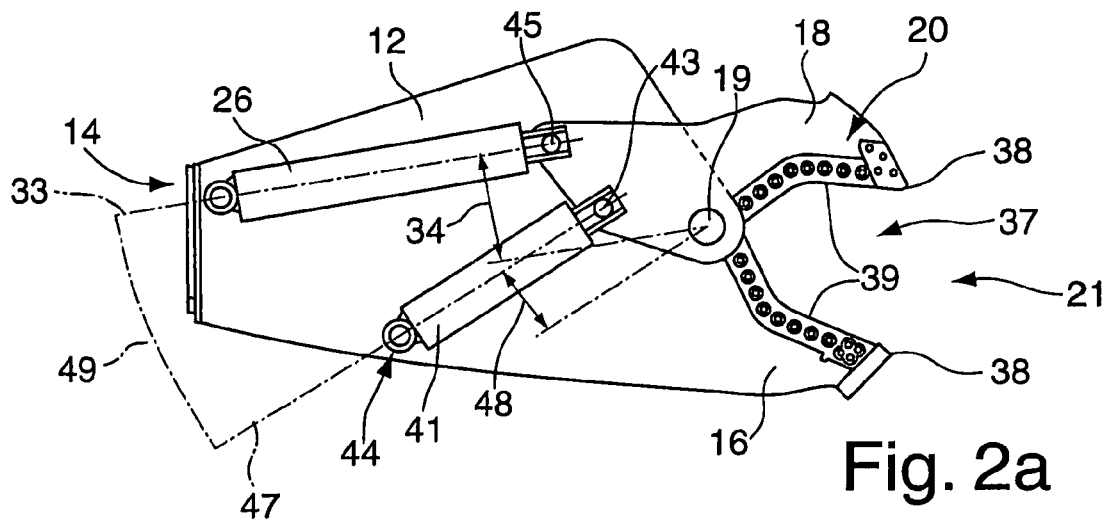
Figure 2B:
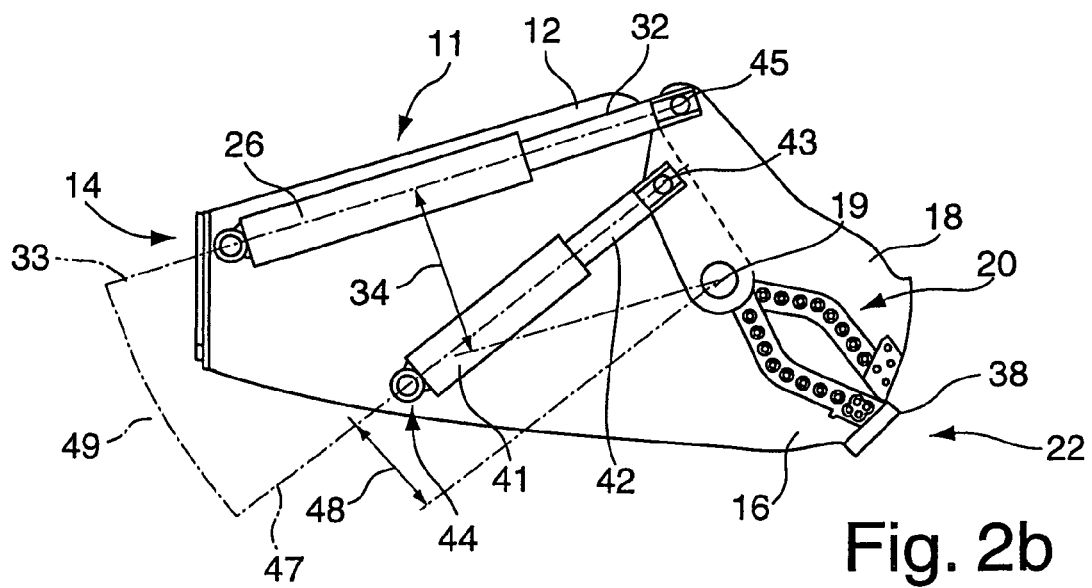
Figure 2C:
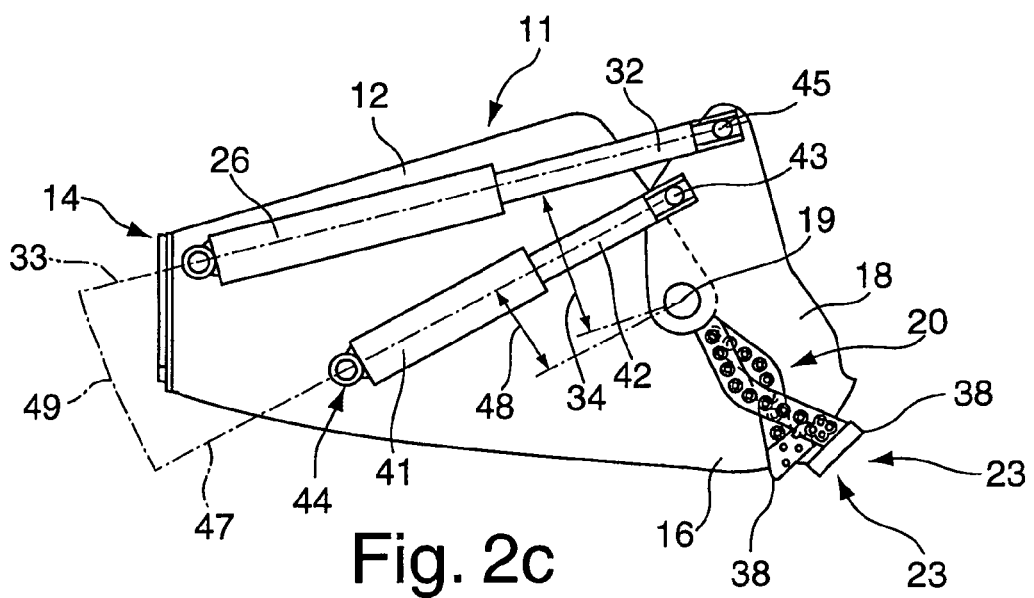
Figure 3:
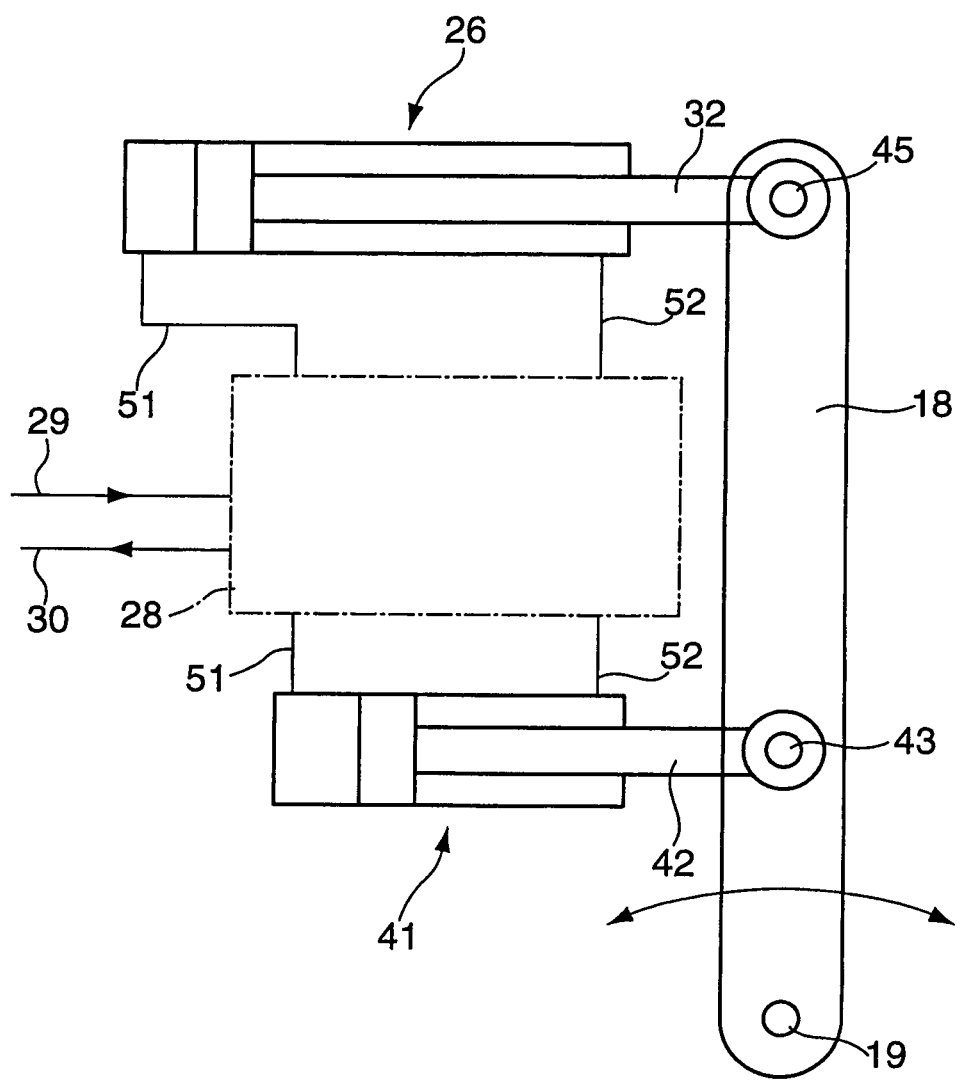

The invention, as well as other advantageous embodiments and developments thereof, will be described and explained in greater detail in the following, with reference being made to the examples shown in the drawings. The characteristics issuing from the description and the drawings may be applied according to the present invention either individually or as a plurality of features taken in any combination. In the drawings:

FIGS. 1a and 1b are schematic side views showing a state-of-the-art, mountable hydraulic appliance with a hinged jaw in an open position and in a closed position, FIG. 2a is a schematic side view showing a mountable hydraulic appliance according to the present invention with a hinged jaw in an open position, FIG. 2b is a schematic side view of the mountable appliance according to FIG. 2a with a hinged jaw in a cutting position, FIG. 2c is a schematic side view of the mountable appliance according to FIG. 2a in a closed position, and FIG. 3 is a schematic diagram of a hydraulic control device of the mountable appliance.

FIGS. 1a and 1b represent a mountable appliance 11 which is known from DE 600 21 539 T2. Fully extensive reference will be made to this publication. The mountable hydraulic appliance 11 comprises a housing 12 having a coupling interface 14 by means of which said mountable hydraulic appliance 11 is attachable in an easily replaceable manner to a boom not shown in greater detail and to a hydraulic system of a carrier apparatus not shown in greater detail, for example a skidsteer loader or an excavator. The housing 12 comprises a fixed lower jaw 16 or fixed lower projection and a hinged upper jaw 18 or hinged upper projection. The upper jaw 18 is pivotable about a bearing axis 19, said bearing axis 19 being arranged in a stationary manner on the housing 12. As an alternative, differing from the embodiment described above, the jaw 16 may, by analogy with the upper jaw 18, be pivotable about said bearing axis 19.

The upper and lower jaws 18, 16 are each provided with a cutting tool 20. A mountable appliance 11 of this type may in particular allow the cutting of iron and nonferrous metals and may thus be used for recycling tasks. As an alternative to the cutting tool 20, the upper and lower jaws may be provided exclusively with crushing teeth or may additionally be provided with crushing teeth.

In order to activate the movement of the upper jaw 18 from an open position 21 shown in FIG. 1a to a cutting position 22 according to FIG. 1b or to a closed position of the upper jaw 18 with respect to the lower jaw 16 as represented in FIG. 2c, a hydraulic cylinder 26 is pressurised, said hydraulic cylinder 26 being activated via a hydraulic control device 28. This control device 28 is supplied with hydraulic fluid from the hydraulic system via a supply line 29. The hydraulic fluid is returned from the control device 28 to the hydraulic system via a return line 30.

At the beginning of a closing movement of the upper jaw 18, i.e. for initiating a cutting phase, the hydraulic cylinder 26 is pressurised such that a piston rod 32 is extended along a longitudinal axis 33 of the hydraulic cylinder 26. The pivotable arrangement of the upper jaw 18 about the bearing axis 19 results in a lever arm 31 which in the beginning of the cutting phase is considerably smaller than the lever arm 31 in FIG. 1b, in which the upper jaw 18 has been transferred to a cutting position 22.

In this embodiment according to the state of the art, the lever arm 31 is at its maximum when situated in this cutting position, such that the acting compression force, which is applied in the direction of the longitudinal axis 33, will produce a maximum leverage force.

Basically, the structural design of the mountable hydraulic appliance 11 according to FIGS. 1a and 1b has been maintained in the embodiment of the mountable appliance 11 according to the invention as represented in FIGS. 2a to 2c. By analogy, the same is true of an alternative embodiment, not shown in greater detail, in which the lower jaw 16 is equally hinged in a pivotally movable manner about the bearing axis 19, such that both jaws 16 and 18 may pivot like a pair of scissors, or in which the upper jaw 18 is fixed and the lower jaw 16 is movable.

Like the embodiment of FIGS. 1a and 1b, the embodiment of the mountable appliance 11 as represented in FIGS. 2a to 2c has a jaw opening 37 which comprises cutting tips 38 and shearing blades 39. This mountable appliance 11 is configured as a scrap cutter to be used for scrapping jobs. Alternatively, as with the mountable appliance 11 according to the state of the art, a combination consisting of a cutting tool 20 and a crushing tool may be used or the jaw opening 37 may solely be equipped with a crushing tool. Said crushing tool may for example comprise crushing teeth.

Unlike in the embodiment according to FIGS. 1a and 1b, in the first embodiment according to the invention of the mountable appliance 11 as shown in FIGS. 2a to 2c, provision is made for the upper jaw 18 to be actuated by a first hydraulic cylinder 26 and by at least one further hydraulic cylinder 41. For example, the hydraulic cylinder 41, with its piston rod 42, acts upon the jaw 18 in an acting point 43 that is located adjacent to the acting point 45 in which the piston rod 32 of the hydraulic cylinder 26 is arranged. This results in a lever arm 48 for the hydraulic cylinder 41 with respect to the bearing axis 19 which differs from the lever arm 34 of the first hydraulic cylinder 26. Furthermore, provision is preferably made in this embodiment for a longitudinal axis 47 of the hydraulic cylinder 41 to be arranged at an angle of attack 49 differing from that of the longitudinal axis 33 of the hydraulic cylinder 26. The angle of attack of the hydraulic cylinders 26, 41 with respect to the jaw 18 is determined by the orientation of the longitudinal axis 47 of the hydraulic cylinder 41, i.e. by an acting point 44 of the hydraulic cylinder 41 on the housing 12, on the one hand, and by the acting point 43 on the hinged jaw 18 or upper jaw 18, on the other. The same is true, by analogy, of the hydraulic cylinder 26. The length of the effective lever arm 48 is determined by the angle of attack 49 of the hydraulic cylinders 26, 41 and by the distance of the acting points 43, 45 from the bearing axis 19. This enables a simple configuration and determination of the initial cutting force and of a dynamic distribution of cutting forces over the entire closing movement.

Owing to the utilisation of, for example, two hydraulic cylinders 26, 41, each of the two hydraulic cylinders 26, 41 may be smaller than the single hydraulic cylinder used according to the state of the art. This is advantageous in that a broader selection of hydraulic cylinder choices is available. In addition, this arrangement has the advantage of offering a better distribution of forces when introducing the cutting force into the upper jaw 18, due to the separate acting points 43, 45, on the one hand, and to the separate thrust points of the hydraulic cylinders 26, 41 on the housing 12, on the other. Owing to the arrangement of, for example, two hydraulic cylinders 26, 41, it is possible, using an identical volume of hydraulic fluid available for activating the hydraulic cylinders 26, 41, to achieve a greater cutting force at the beginning of the cutting movement which starts from the open position 21, since the sum of the lever arms 34, 48, i.e. the vectors thereof according to FIG. 2a, is greater than the lever arm 31 according to FIG. 1a depicting the state of the art. In this way, it is possible to achieve, for example, a doubling of the cutting force at the beginning of the cutting process. This is particularly advantageous in the cutting of tubes having a diameter corresponding essentially to a maximum jaw opening width. In such applications, it is thus possible to exert an increased cutting force from the very beginning, permitting said tubes to be successfully cut.

Upon initiation of the cutting movement, the upper jaw 18 is transferred to a cutting position 22, as shown in FIG. 2b. This cutting position 22 is reached when the cutting tips 28 are situated opposite each other or when the cutting tip 28 of the upper jaw 18 plunges into the cutting tip 28 of the lower jaw 16. In FIG. 2c, the upper jaw 18 has reached the closed position 23.

Alternatively, provision may be made for the longitudinal axes 33, 47 of the first hydraulic cylinder 26 and the at least one further hydraulic cylinder 41 to be arranged in parallel orientation instead of an arrangement of the longitudinal axes 33, 47 at divergent angles. In this way, analogous advantages may be achieved. In some cases, an arrangement of this type may be suitable to match a given installation space.

As an alternative, differing from the mountable appliance 11 of FIGS. 2a to 2c, the upper jaw 18 may be acted upon by a third hydraulic cylinder or by further hydraulic cylinders. As the number of hydraulic cylinders acting on the jaw 18 increases, the distances between the individual acting points 45, 41 will decrease. Correspondingly, the angles of attack of the individual hydraulic cylinders or their respective, parallel spacing may be mutually adjusted. This may mean, on the one hand, that the longitudinal axes of the hydraulic cylinders 26, 41 acting on the hinged jaws 16, 18 are all divergent from one another. Likewise, provision may be made for all of the hydraulic cylinders 26, 41 to be oriented parallel with one another, or else provision may be made for a combination of these two embodiments to be possible, so that a hinged jaw may at the same time be acted upon by some hydraulic cylinders 26, 41 oriented parallel with one another and some others oriented at angles divergent from one another. On the other hand, the compression force acting on the hinged jaw 18 is increased.

The term housing 12 is intended to refer to both a closed housing such as the one represented in FIGS. 2a to 2c, and an open housing, which may be configured, for example, in the form of a supporting frame or a supporting structure.

FIG. 3 schematically represents a hydraulic diagram of the control device 28 for activating the two hydraulic cylinders 26, 41 of the mountable appliance 11 according to FIGS. 2a to 2c. Via the supply line 29, the control device 28 is supplied with hydraulic fluid for initiating a pivotal movement. A piston-side connection line 51 leads from the control device 28 to each of the hydraulic cylinders 26, 41, respectively. Likewise, a piston-rod-side connection line 52 is arranged between the respective hydraulic cylinders 26, 41 and the control device 28. The hydraulic cylinders 26, 41 acting on the hinged jaw 18 are connected in parallel. In FIG. 3, the hinged jaw 18 which is activated for pivotal movement about the bearing axis 19 is only depicted symbolically. The control device 28 comprises at least one valve, not shown in greater detail. In addition, further valves for activating the hydraulic cylinders 26, 41 may be present either individually or jointly and may be activated selectively.

The control device 28 makes it possible to activate the hydraulic cylinders 26, 41 in a flexible manner. By way of example, in a first embodiment the at least two hydraulic cylinders 26, 41 may be pressurised simultaneously. Due to the fact that the hydraulic cylinders 26, 41 are connected in parallel, they will not mutually get in each other's way. In addition, a valve for rapid-mode operation may be activated until an increase in required pressure force occurs, i.e. until the beginning of the cutting process. Subsequently, said valve is closed, in view of a further activation of the cutting process.

In the opening movement of the hinged jaw 18 to an open position 21, only one of the two hydraulic cylinders 26, 41 may be pressurised. Additionally, a rapid-mode valve may be connected both for an opening movement of the cylinder and for at least a first phase of a closing movement in order to achieve short cycle times. This permits to transfer hydraulic fluid from a piston-rod-side chamber to a piston-side chamber or vice versa. Upon reaching a given pressure level, the rapid-mode valve is closed.

Furthermore, provision may be made for the activation of a closing movement to be carried out in such a manner that initially the hydraulic cylinder 26 or the hydraulic cylinder 41 is pressurised via at least one valve until an increase in required cutting force is encountered, whereupon the further hydraulic cylinder 26, 41 is connected via a valve in order to provide the increased cutting force. This has the advantage of enabling a rapid initial closing movement. The opening movement is preferably activated by means of only one hydraulic cylinder 26 or 41, in particular via one or several valves, in order to enable a fast opening or rapid return of the upper jaw 18 to an open position 21.

By analogy, the same is true of embodiments comprising two or more hydraulic cylinders which serve for activating the hinged jaw 18 and the longitudinal axes of which are arranged parallel with one another and/or at a divergent angle of attack relative to one another.

The invention claimed is:

1. A method of activating a mountable hydraulic appliance for the shearing or crushing of structures for demolition, comminution or recycling, which has an upper jaw and a lower jaw at least one of which is pivotally hinged on a bearing axis arranged on the housing, wherein
    the hinged jaw is activated by a first hydraulic cylinder acting on a first acting point of the hinged jaw and by at least one further hydraulic cylinder acting thereon so as to be moved from an open position to a cutting position and/or a closed position and vice versa, both the first and the at least one further hydraulic cylinders acting on the hinged jaw using lever arms for force introduction which differ from each other, and
    a closing movement of the at least one hinged jaw is such that initially only the one of the hydraulic cylinders is activated which in a first closing phase has a higher closing speed and/or a greater lever arm than the at least one further hydraulic cylinder and that in an ulterior phase of the closing movement, in which an increase in required compression force takes place, the at least one further hydraulic cylinder is additionally activated, such that at that point in time during the closing movement an increased closing force is generated.

2. The method as claimed in claim 1, wherein only one hydraulic cylinder is pressurised for causing an opening movement of the at least one hinged jaw to an open position.

3. The method as claimed in claim 1, wherein the hydraulic cylinder is or the hydraulic cylinders are activated via at least one valve of a hydraulic control device so as to perform an opening movement or a closing movement of the at least one hinged jaw.

4. The method as claimed in claim 1, wherein the at least one further hydraulic cylinder is activated, during a closing movement of the at least one hinged jaw as a damping cylinder counteracting the at least one hydraulic cylinder which performs said closing movement.

5. A mountable hydraulic appliance for the shearing or crushing of structures for demolition, comminution or recycling,
    which is attachable to a boom and to a hydraulic system of a carrier apparatus,
    having a housing and a coupling interface,
    having an upper jaw and a lower jaw, at least one of the two jaws being pivotally hinged on a bearing axis arranged on the housing, and
    having a first hydraulic cylinder acting on the hinged jaw in a first acting point and abutting with its opposite end against the housing, and
    having at least one further hydraulic cylinder upon which the hinged jaw is acted the at least two hydraulic cylinders act on the hinged jaw forming a jaw opening by using lever arms differing from one another and that acting points of the hydraulic cylinder are provided on the hinged jaw opposite to the bearing axis of the jaw opening.

6. The mountable appliance as claimed in claim 5, wherein the at least one further hydraulic cylinder acts on the hinged jaw in a further acting point and that a distance between the first acting point of the first hydraulic cylinder and a bearing axis on the hinged jaw differs from a distance between the further acting point of the further hydraulic cylinder and said bearing axis.

7. The mountable appliance as claimed in claim 5, wherein the hinged jaw is acted upon by at least one further hydraulic cylinder the longitudinal axis of which is arranged at an angle of attack that is divergent from that of the longitudinal axis of the first hydraulic cylinder.

8. The mountable appliance as claimed in claim 5, wherein an acting point of the at least one further hydraulic cylinder coincides with an acting point of the first hydraulic cylinder.

9. The mountable appliance as claimed in claim 5, wherein the hinged jaw is acted upon by at least one further hydraulic cylinder the longitudinal axis of which is arranged parallel with the longitudinal axis of the first hydraulic cylinder.

10. The mountable appliance as claimed in claim 5, wherein the first hydraulic cylinder and the at least one further hydraulic cylinder abut against the housing.

11. The mountable appliance as claimed in claim 5, wherein the first and the at least one further hydraulic cylinders, with their respective piston rods, act on the hinged jaw or on the housing.

12. The mountable appliance as claimed in claim 5, wherein the angle of attack of the first hydraulic cylinder has a lever arm which is greater than a lever arm of the at least one further hydraulic cylinder when the hinged jaw is in an open position.

13. The mountable appliance as claimed in claim 5, wherein the hydraulic cylinders acting upon the hinged jaw are pressurisable in parallel and a piston-side connection line and a piston-rod-side connection line are provided between a hydraulic control device and both the first and the at least one further hydraulic cylinders, respectively.

14. The mountable appliance as claimed in claim 5, wherein the sum of the cylinder volumes of the hydraulic cylinders acting upon the hinged jaw is less than or equal to the maximum delivery volume of the hydraulic system.

15. The mountable appliance as claimed in claim 5, wherein the hydraulic cylinders acting upon the hinged jaw have differently dimensioned piston diameters.

* * * * *